United States Patent [19]
Goheen et al.

[11] 3,915,959
[45] Oct. 28, 1975

[54] ACTIVATED ALKALI CELLULOSE AND DERIVATIVES FORMED THEREFROM AND A PROCESS FOR MAKING THE SAME

[75] Inventors: David W. Goheen, Camas; Michael D. Fahey, Vancouver; Harvey L. Claussen, Seattle, all of Wash.

[73] Assignee: Crown Zellerbach Corporation, San Francisco, Calif.

[22] Filed: Mar. 15, 1974

[21] Appl. No.: 451,646

[52] U.S. Cl............................ 260/233; 260/231 CM
[51] Int. Cl.² ...................... C08B 1/08; C08B 11/00
[58] Field of Search...................... 260/233, 231 CM

[56] References Cited
UNITED STATES PATENTS

| | | | |
|---|---|---|---|
| 1,279,328 | 9/1918 | Glover et al. | 260/233 |
| 1,507,210 | 9/1924 | Seel | 260/231 R |
| 1,578,405 | 3/1926 | Decew | 162/26 |
| 2,568,783 | 9/1951 | Woodruff | 241/65 |
| 2,767,170 | 10/1956 | Graybeal et al. | 260/233 |
| 3,273,807 | 9/1966 | Wright | 241/42 |
| 3,322,748 | 5/1967 | Tokimatsu et al. | 260/233 |
| 3,382,140 | 5/1968 | Henderson et al. | 162/26 |
| 3,597,310 | 8/1971 | Sumi et al. | 162/26 |
| 3,661,328 | 5/1972 | Leask | 241/65 |
| 3,808,090 | 4/1974 | Logan et al. | 162/26 |
| 3,857,833 | 12/1974 | Warzecha et al. | 260/233 |

FOREIGN PATENTS OR APPLICATIONS

| | | | |
|---|---|---|---|
| 434,540 | 9/1935 | United Kingdom | 260/233 |
| 470,686 | 1/1951 | Canada | 260/233 |

*Primary Examiner*—Ronald W. Griffin

[57] ABSTRACT

A novel activated alkali cellulose material is provided herein. Furthermore, a novel process is conducted for preparing this activated alkali cellulose product which comprises reacting cellulose and a caustic reagent in a high energy reactor. Cellulose derivatives can then be formed by combining an appropriate chemical reactant with the activated alkali cellulose, either directly in the high energy reactor, or by interacting the respective activated cellulose material and chemical reactant in a subsequent step. Low viscosity alkali cellulose derivatives can also be rapidly and efficiently formed by employing an oxidizing gas during the reaction step.

36 Claims, 3 Drawing Figures

ACTIVATED ALKALI CELLULOSE AND DERIVATIVES FORMED THEREFROM AND A PROCESS FOR MAKING THE SAME

This invention relates to a novel activated alkali cellulose product, and to derivatives formed therefrom, and to a process for making the same. Activated alkali cellulose is defined as an alkali cellulose material in which the caustic reagent substantially penetrates (is not merely combined topichemically), and is uniformly distributed along, the cellulose fiber. The resultant novel alkali cellulose product, owing to the substantial penetration of the caustic, in a uniformly distributed manner, can then be readily combined with a chemical reactant to efficiently form high quality, uniformly substituted cellulose derivatives. Contrarily, topichemical treatment of the pulp, which includes mixing, wetting, or conditioning of the cellulose fibers with a caustic reagent, does not provide for effective, rapid penetration of the cellulose fiber by the caustic.

The process of this invention, which is employed in forming the above cellulosic materials, includes the rapid, controlled, high energy reaction of a high consistency, preferably undried and unparticularized, cellulosic pulp, with a caustic reagent, in a high energy reactor. The activated alkali cellulose product formed is then recovered or, alternatively, combined with an appropriate chemical reactant to efficiently and economically produce the desired cellulosic derivative.

Alkali cellulose per se, and reaction products therefrom, particularly cellulose ethers, are well-known to the prior art. In the direct preparation of these materials, it is an accepted principle that high quality, uniformly substituted cellulose derivatives begin with high quality, uniformly substituted cellulose derivatives begin with high quality, uniformly substituted alkali cellulose. The grade of alkali cellulose produced is generally based on two factors. The first factor is the manner in which the caustic reagent is associated with the cellulose fiber. And, the second factor is the relative distribution of caustic reagent along the cellulosic backbone.

Conventional methods set forth numerous problems which exist in the formation of an acceptable alkali cellulose product. For example, the prior art indicates that although some conventional processes suggest contacting a more concentrated caustic solution with the cellulose in order to provide a more uniformly substituted product, a rapid swelling of the fiber surfaces will result unless the feed is first dried and particularized. The prior art then concludes that only a relatively small quantity of uniformly substituted cellulose derivatives can be efficiently and economically produced from alkali cellulose prepared from undried, unparticularized pulp in the presence of concentrated caustic.

Another concern expressed by the prior art is the effect of mechanical treatment on the pulp in the presence of caustic and water. More specifically, it has been found that severe mechanical treatment results in an undesirable degradation of the alkali cellulose product. Therefore, a low consistency cellulosic feed is typically employed to reduce this unwanted effect.

Most known methods require relatively long, uneconomical periods of time for the preparation of the required cellulose feed, for the formation of alkali cellulose, and finally, for the conversion of the alkali cellulose produced into the respective cellulosic derivatives. And, even though these known processes require these relatively long reaction periods, reaction efficiencies of well below fifty percent normally result.

Various solutions have been proposed by the prior art to overcome the aforementioned problems. For example, in an attempt to produce a uniform alkali cellulose product, U.S. Pat. No. 2,767,170 to Graybeal et al. provides a low consistency slurry process wherein cellulose, in particulate form, is suspended in an organic slurrying medium, and then contacted with caustic alkali and water. A liquid attrition zone is established within the slurry and, by repeatedly passing successive portions of the cellulosic particles therethrough, the individual cellulose particles can interact with the caustic and water to form alkali cellulose. The above method, however, requires the employment of several unnecessary and costly steps. More specifically, the cellulose feed employed must first be particularized, i.e., cut or ground into fine particles, in order to increase reactivity of the reaction. Furthermore, the cellulose fibers are normally dried or otherwise heat-treated to expedite the required grinding step. Particularizing and drying of the cellulose prior to reaction imposes an increased cost to the manufacturer. But, more importantly, particularizing and drying have a deleterious effect on the resultant cellulose derivatives. Therefore, cellulose derivatives prepared from cellulose which has been dried and ground generally suffer from a reduction in final viscosity and a corresponding inability to form derivatives of high molecular weight. And, in cases where high viscosity derivatives are required, they cannot be readily prepared from wood-derived cellulose if the cellulose has been dried and ground. In addition to the increased costs of drying, grinding, storing, and the like, required by employing this process, replacement of wood-derived cellulose with the more expensive cotton-derived cellulose becomes necessary.

Another problem which occurs When the cellulose is ground and dried prior to reaction concerns the solubility characteristics of the derivatives formed. It has been found that the resultant derivative materials do not readily dissolve in water and, in fact, contain a large number of visible gel agglomerates and unreacted cellulosic fibers. Solubility problems of this type are generally associated with the nonuniform distribution of caustic along the cellulose fibers. As previously stated, the particularizing and drying of the cellulose prior to its reaction with a caustic reagent is a technique employed by most conventional prior art methods.

Another problem present in most conventiona methods is that they require lengthy reaction times. More specifically, most of these reactions require a time period of at least from 40 minutes to about 2½ hours in order to produce a cellulosic product. Accordingly, the reaction periods described in the prior art would increase, in a substantial manner, the overall cost of manufacture of the cellulosic derivatives.

Finally, the economic feasibility of the Graybeal process is further limited by the general use of low consistency cellulose slurries. Graybeal employs a critical upper limit of consistency of only about six percent by weight of cellulose, based on the total solution weight, in order to overcome the nonuniformity problem discussed previously. Therefore, the amount of alkali cellulose product formed per hour, according to the teachings of Graybeal, would be much lower than for a comparable high consistency feed during an equivalent reaction rate.

Another known method, U.S. Pat. No. 2,680,737 Grassie, relates to the preparation of alkali cellulose, suitable for use in making soluble cellulose ethers, by first forming a slurry of comminuted ground cellulose in an alcohol-water medium. More specifically, the cellulose is first dried and ground (comminuted) prior to reaction, the comminuted particles formed being small enough to pass through the openings of a standard 35-mesh sieve or screen, i.e., about 0.420 mm. Grassie states that the smaller the individual particles, the higher the percentage by weight of the cellulose which can be satisfactorily slurried in the alcohol and water, i.e., in a range of from about four and one-half percent and thirteen percent by weight. A reaction time of about 40 minutes to about 2½ hours is again required. All the problems previously described concerning the process of Graybeal are present herein since, as before, a dry, particularized cellulose feed is reacted at relatively low consistency, for an extended period of time, in an attempt to prepare the requisite cellulosic derivative.

Another known method, U.S. Pat. No. 3,322,748 Tokimatsu, provides rotary circular discs which continuously mix dry, finely pulverized pulp, caustic soda and an etherifying agent at high speeds. The pulp, caustic and etherifying agent are discharged as a film-like jet of mist from the edges of the respective discs and are directed to collide and instantaneously intermix one with the other. Control of the mixing step is quite difficult since the amount and rate of charging materials must be exactly controled, intermittent supplies of raw materials not being permitted. Moreover, the use of a dry, finely pulverized pulp, the major portion of which must be capable of passing through a 100-mesh screen, is employed as the basis of overcoming the aforementioned prior art problems, including swelling of the cellulose on exposure to caustic, reduction of the alkali cellulose contact area, nonuniformity of the derivative products formed, and low efficiency.

U.S. Pat. No. 3,273,807 Wright sets forth another process for continuously *mixing*, in a disc refiner, dried and shredded alpha cellulose fiber solids and a conditioning fluid, such as caustic, to produce a fluffed pulp in which only topichemical association between the respective fluid and pulp occurs. Therefore, the fibers are merely individually coated with the conditioning fluid. The formation of alkali cellulose is provided in a subsequent reaction step.

U.S. Pat. No. 1,578,405 DeCew comprises a process for heating a low consistency cellulose fiber slurry in the presence of dilute caustic to treat, as in U.S. Pat. No. 3,273,807, the outer surfaces of the cellulose fibers. In this case, the surface coating is provided for purposes of making fibers capable of adhering more firmly to one another when subsequently formed into a sheet of paper. Since it is a purpose of this process to only treat the surface of the fiber, grinding of the cellulose feed is not necessary. Furthermore, a concentrated caustic solution, such as required in the preparation of activated alkali cellulose, is not employed herein, since there is no need for a substantial amount of caustic to be associated with, and uniformly substituted along, the cellulose fiber backbone.

Finally, a process for manufacturing cellulose ethers has been described in U.S. Pat. No. 1,507,210 Seel, wherein cellulose, alkali, water and an etherification agent are charged into a disintegrating mill which subjects the ingredients to rapid and repeated impacts sufficiently violent to thoroughly disintegrate the fibers. The action imparted by the mill fractures and cuts the fibers as the alkali cellulose is being produced and, in so doing, forms the basis by which intimate mixing of the reactants is obtained. In spite of this violent milling action, a 24-hour reaction period is still required. As in the previously described methods, this process requires particularization of the cellulose fibers in an attempt to promote a more complete, uniform reaction of the cellulose and the caustic reagent. The only difference between the respective methods resides in the place where particularization occurs, i.e., in the reactor itself instead of grinding prior to addition to the reactor.

It is, therefore, an object of the present invention to provide highly reactive activated alkali cellulose material in which the caustic has substantially penetrated the cellulose fiber.

It is a further object of the present invention to provide an activated alkali cellulose product having a uniform distribution of the caustic reagent along the cellulose fiber.

It is another object of the present invention to provide a preferred activated alkali cellulose product, and derivatives therefrom, in which the weighted average fiber length, which will hereinafter be described, is maintained within the range required for papermaking purposes.

It is an object of this invention to provide a method for rapidly and efficiently producing the subject activated alkali cellulose product, and for forming cellulose derivatives therefrom, which comprises confricating a high consistency cellulose feed, in the presence of caustic, and in a high energy reactor. Confrication is defined as high energy, frictional interaction of the cellulose feed fibers, which are maintained in relatively intimate contact one with the other, preferably without substantial particularization of the cellulose fiber structure. The confrication step is preferably conducted using cellulose fibers which have not undergone substantial prior drying or particularizing.

It is another object of this invention to provide a continuous process for the efficient production of activated alkali cellulose and high quality cellulose derivatives.

It is still a further object of this invention to provide a process for preparing derivatives of alkali cellulose which dissolve readily in water and are substantially free of agglomerated gel particles and unreacted cellulosic fibers.

It is still another object of this invention to provide the above described cellulose derivatives by either subsequently combining the chemical reactant with the activated alkali cellulose produced or, in a preferred embodiment, by adding the cellulose feed, caustic, and chemical reactant directly to the high energy reactor.

It is a further object of this invention to provide, by means of a similar reaction scheme which will hereinafter be described, a process capable of rapidly and economically producing low viscosity derivatives of activated alkali cellulose.

These and other objects and advantages of this invention will be apparent from the following description with reference to the accompanying drawings, wherein.

Figure 1:
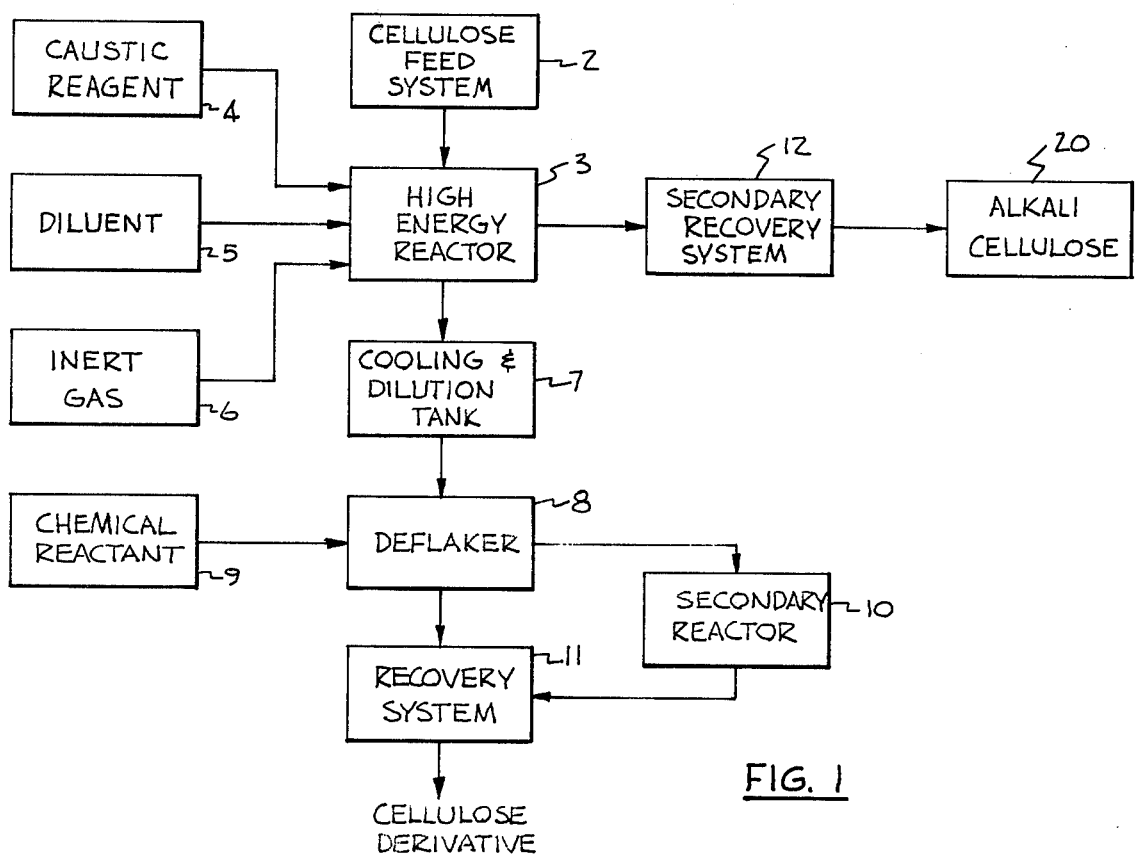
FIG. 1 is a schematic view in block form illustrating a process flow sheet in which activated alkali cellulose and/or derivatives therefrom are continuously produced by the basic process of the present invention.

The novel activated alkali cellulose fibers of the present invention can be rapidly and efficiently formed by confricating a high consistency cellulosic feed material in the presence of a caustic reagent in a high energy reactor. It is preferred that the aforementioned cellulose feed stock not be particularized prior to the reaction step. More specifically, under these preferred conditions, it is possible to retain greater than 75%, and preferably greater than 80%, of the feed on a standard 35-mesh screen (see TAPPI Method T233 Su-64). This is in contradistinction to prior art processes which provide that substantially all of the cellulose feed stock passes through a 35-mesh screen.

The cellulose material is then combined with water and, if desired, a diluent to form a high consistency feed, which is then reacted with a caustic reagent. A requisite high degree of confricating energy is then imparted to this high consistency mixture. Although previously known cellulose-caustic reactions generally require a 1- to 3-hour reaction time to form alkali cellulose, the formation of the subject activated alkali cellulose is completed in relatively rapid fashion. More specifically, the period required to produce activated alkali cellulose, measured from the time that the cellulose and caustic contact one another, is less than about 90 seconds and, preferably, less than about 30 seconds.

The activated alkali cellulose product is then recovered, or, alternatively, subsequently interacted with an appropriate chemical reactant to produce cellulose derivatives having readily controllable physical and chemical properties. In a preferred embodiment of this invention, the chemical reactant is added directly to the high energy reactor instead of at a subsequent point in the process.

By employing the above process or the process of the preferred embodiment, more uniformly substituted cellulose derivatives are efficiently produced. This uniformity is evidenced by the degree of solubility of these materials in water. Accordingly, aqueous solutions of the subject derivatives are provided which are substantially free of gelled agglomerates and unreacted fibers, have a higher molecular weight, and exhibit a narrower molecular weight range than comparable conventional products.

The activated alkali cellulose product itself is a highly reactive material in which the caustic reagent has substantially penetrated the cellulose fiber in a uniformly distributed manner. By employing the previously defined activated alkali cellulose as a reaction herein, uniformly substituted, high quality cellulose derivatives are efficiently produced. The ability to form activated alkali cellulose, and in turn the above cellulose derivatives, can be determined by examining the extent to which the caustic has uniformly penetrated the cellulose fibers. More specifically, an experiment is run in which the subject alkali cellulose product is neutralized with acid to determine the total number of acid additions necessary to permanently maintain the alkali cellulose at a constant pH of 7; therefore, the higher the total number of acid additions required to neutralize the alkali cellulose product, the greater the extent to which the caustic has uniformly pnetrated the alkali cellulose fibers, the greater the amount of activated alkali cellulose formed, and the greater the amount of high quality, uniformly substituted cellulose derivatives present. Moreover, as will be subsequently demonstrated, by providing an increase in the amount of activated alkali cellulose formed, an increase in the efficiency of utilization of the chemical reactant employed in preparing the requisite cellulose derivatives will result.

The total number of acid additions required to achieve the above defined state of neutralization is hereinafter defined as the "penetration coefficient". For example, a penetration coefficient of "one" would mean that only one addition of acid would be required to maintain a given alkali cellulose sample at a pH of 7. A more detailed showing of the procedure used in determining the penetration coefficient is hereinafter set forth in Example 1. By comparing the penetration coefficients of various alkali cellulose materials, the relative uniformity of caustic distribution and the relative extent of substantial caustic penetration of a given alkali cellulose sample can be determined. Furthermore, the relative ability to form uniformly substituted cellulose derivatives can be established. Penetration coefficients of greater than about six, and preferably more than 15, are within the scope of the present invention.

The activated alkali cellulose formed is then combined with a chemical reactant to form a cellulose derivative having controlled physical and chemical properties. As previously stated, a further measure of the relatively high reactivity and uniform distribution, respectively, of the activated alkali cellulose is the relatively high efficiency of utilization of the chemical reactant in preparing the subject cellulose derivatives. More particularly, as opposed to conventional methods which generally exhibit utilization efficiencies of less than 50%, the efficiency of the cellulose derivatives of the present invention is greater than about 65%, and preferably greater than about 70%.

In the basic process of this invention, the activated alkali cellulose is removed from the high energy reactor, the temperature and consistency of the reaction product lowered, and then added to a second reactor where it is combined with the desired amount of a chemical reactant. Alternatively, the chemical reactant is added directly to the high energy reactor, eliminating the need for a second reaction step. A high quality cellulose derivative is then produced, by either method, after passage of the requisite period of time. Conventional techniques are then employed to recover the product.

It is preferred that the cellulose constituent employed for use in the subject feed stock be preserved in an unparticularized state. For purposes of this preferred embodiment, an unparticularized cellulose feed is that which will provide an activated alkali cellulose product and derivative products therefrom, having a weighted average fiber length equivalent to that of a cellulosic papermaking fiber. Typically, cellulosic feed material having a weighted average fiber length of greater than 1.0 mm, and preferably greater than 1.5 mm, can be utilized in preparing the papermaking-length alkali cellulose product of this invention. TAPPI Standard T233 Su-64 sets out the basis for calculating the value of the weighted average fiber length in millimeters. In Volume No. 55, No. 2 of the January 1972 issue of TAPPI, a simplified method of calculating the average fiber length is set forth. The article, which is entitled "The Fiber length of Bauer-McNett Screen Fractions", is written by J. E. Tasman and appears on page 136 of the aforementioned TAPPI publication. This simplified method has been employed in deriving the weighted average fiber length values presented herein. The generally recognized minimum value, in the paper industry, for the weighted average fiber length required for the production of papermaking fibers, is about 0.75 mm. However, a weighted average length of greater than about 1.25 mm is preferred.

The ability to maintain the above weighted average fiber length is of particular utility in applications, such as papermaking, where the formation of a fibrous web is required. For purposes of determining whether the requisite papermaking fiber length has been maintained, the "percent fiber length retention" of a given alkali cellulose material is determined. This is accomplished by comparing the weighted average fiber length of the activated alkali cellulose fibers recovered from the reactor, or that of the subsequently formed cellulose derivatives, with weighted average fiber length of the cellulose feed. This comparative value is expressed as follows:

$$\% \text{ fiber length retention} = \frac{\text{Weighted average fiber length of alkali cellulose or derivative thereof}}{\text{Weighted average fiber length of the cellulosic feed}} \times 100$$

The activated alkali cellulose material of the present invention or its derivatives, provide a percent fiber length retention value of more than about 50% and, preferably, more than 60%.

For the previously described reasons, it is also preferred that the cellulose be maintained in an undried state prior to make-up of the cellulose feed stock. A minimum ovendried (O.D.) cellulose pulp of less than 80%, and preferably less than 60%, is required for preservation of the above undried status.

Referring now to FIG. 1, a cellulose feed system 2 is employed to provide a high consistency cellulosic fiber feed stream to high energy reactor 3. Any material containing a cellulosic constituent can be employed in forming the high consistency cellulosic feed. Suitable materials from which cellulose can be derived include the usual species of coniferous pulp wood such as spruce, hemlock, fir, pine, and the like. Deciduous pulp wood such as poplar, birch, cottonwood, alder, etc., as well as from fibrous nonwoody plants used in papermaking exemplified by cereal straws, cornstalks, bagasse, grasses, and the like, may also be used. Additionally, in order to overcome increasing costs, and in compliance with numerous ecological considerations, substandard grades of wood pulp may be employed in the process of this invention.

Consistency, as used herein, refers to the percent by weight on a dry basis of the fibers in the feed. The cellulose feed, which is normally prepared as an aqueous mixture is dewatered and reduced to a high consistency so that the respective fiber surfaces are in intimate contact. Consistencies ranging from about 10% to 60%, and preferably from about 15% to 35%, are advantageously employed.

The individual cellulose fibers are then separated from the *lignin lamella*, i.e., the adhesive-like substance which binds them together and surrounds the multiple layers of cellulosic fibers, by conventional means, such as chemical or semi-chemical pulping. The above feed should preferably comprise cellulosic pulp of at least 70 G.E. brightness points and have an alpha-cellulose content of at least 80%.

A preferred step in this process is the removal of a substantial amount of the fine matter contained in the pulp prior to charging it to the reactor which produces derivatives of greater clarity and higher solution viscosity. Fine matter such as ray cells and the like are the fine particles contemplated for removal herein. Various methods known to the prior art, such as centri-cleaning or side-hill screening, may be availed of in performing this removal step.

Since high consistency cellulosic feed, in the usual instance, is in a semifluid state, it is generally considered nonpumpable, Therefore, a device capable of transporting the relatively immobile feed, such as a screw conveyor, or like equipment, is used to charge the high consistency material to high energy reactor 3.

Reactor 3 can be of any type capable of transmitting an amount of energy sufficient for imparting the requisite degree of confrication to the cellulose fibers. The application of high energy confricating forces to the cellulosic material initiates the uniform and essentially complete association of the caustic reagent with the cellulosic fibers, thus producing activated alkali cellulose product 20. Although the degree of energy imparted to the fibers during confrication is high, it is preferred that a reactor be chosen which does not substantially particularize the feed fibers.

Various types of high energy equipment can be employed, assuming that the celulose-caustic reagent reaction is conducted under the proper reaction conditions, so that confrication of the cellulosic feed will result. For example, a disc refiner, such as the Bauer 415, can be utilized as means for conducting the selective chemical reaction of this invention. This is essentially the same refiner, in principle, as the one disclosed in U.S. Pat. Nos. 2,214,704 and 2,568,783, respectively. Operation of a refiner such as the Bauer 415, in the mechanical sense, is specifically discussed in the aforementioned patent applications. However, as will be pointed out in Example 4, not all reactors and, in fact, not all refiners, can per se be used in making the activated alkali cellulose of this invention.

The amount of energy imparted to the high consistency feed must be of sufficient magnitude to produce confrication. The power input and feed rate of the cellulose are therefore controled, depending on the type and quality of feed stock, so that the minimum amount of energy imparted to the fibers is about 8 horsepower days per ton of air-dried pulp (HPD/T), i.e., the total daily horsepower required to produce one ton of pulp, and preferably about 15 HPD/T. An upper energy limit of about 40 HPD/T, and preferably 25 HPD/T should be maintained.

In order to prevent unwanted degradation of the activated alkali cellulose, or derivatives therefrom, during the reaction step, the interior of the high energy reactor is preferably blanketed with an inert gas 6, such as nitrogen and the like.

In producing activated alkali cellulose 20, a caustic reagent 4 is added to high energy reactor 3 where it chemically combines with the high consistency cellulose feed. Although most strong soluble bases can be employed as reagent 4, a Group 1A metal hydroxide, such as sodium hydroxide, lithium hydroxide, potassium hydroxide, and the like, is preferred. The amount of caustic reagent charged to the reactor generally varies from about 0.9 to 3.0 moles/mole of anhydrocellulose. If only alkali cellulose is to be prepared, the preferable amount of caustic added is from about 1.0 to 2.0 moles of caustic/mole of anhydrocellulose. However, if the activated alkali cellulose is to be combined with chemical reactant 9 to form a cellulose derivative, about 2.1 to 2.6 moles of caustic is preferably charged since a portion of this material will be neutralized by the addition of the chemical reactant.

In carrying out the alkali cellulose reaction, as well as subsequent conversion thereof to form a cellulosic derivative, it is a common practice to incorporate a diluent with the cellulosic feed. The main criteria in selecting a diluent is that it be soluble in water, that it not readily react with the chemical reactant, and that it be relatively volatile and capable of dissolving any undesirable by-products. Although most inert organic diluents, including aromatic hydrocarbons such as benzene, xylene and toluene; aliphatic hydrocarbons such as hexane and heptane; and compounds such as tetrahydrofuran and dioxane, can be employed, an aliphatic alcohol is, in general, preferred, the short-chain aliphatic alcohol such as ethanol, t-butanol, secbutanol, and especially isopropanol, being even more preferred.

The amount of water in the cellulose, the concentration of the caustic reagent, and the amount of diluent added are charged so that the resulting consistency is within the previously described range, i.e., between about 10% and 60%. If activated alkali cellulose 20 per se is to be the final product, the material formed in reactor 3 is preferably transferred to secondary recovery system 12, and the alkali cellulose recovered by known conventional methods.

If cellulosic derivatives are to be prepared, the activated alkali cellulose produced in the high energy reactor 3 is fed to cooling and dilution tank 7, which contains enough cooled organic diluent to lower the temperature of the product to about −10° to 35° C., preferably to from about 0° to 10° C., while the consistency level is reduced to from about 0.5% to 25%, preferably from about 3% to 6%.

After stirring for several minutes, the mixture can be fed to deflaker 8 or directly to secondary reaction tank 10. Typically, a deflaker such as Morden-Escher-Wyss deflaker, bearing the designation "Enstripper No. NR.5227", or like equipment, can be employed herein.

With good agitation, the chemical reactant 9 is then added to the deflaker or, if the deflaker is to be bypassed, directly to the secondary reactor. Although many compounds can be reacted with the activated cellulosic product herein, chemical reactants which produce cellulose xanthate (sodium celluloee dithiocarbamate) and cellulose ethers such as methyl, ethyl, benzyl, hydroxyethyl, and carboxymethyl cellulose, are preferred. If, for example, the formation of carboxymethyl cellulose is desired, chemical reactant 9 would be chloroacetic acid, or the chloroacetate thereof, and, depending on the desired degree of substitution of carboxymethyl groups, the ratio of chloroacetic acid to cellulose will vary from 0.7 to about 1.5 moles/mole and preferably from about 0.9 to 1.3 moles/mole. The addition of chemical reactant 9 is continued with suitable agitation until such time as the total amount of energy imparted to the fibers from about 1 to 10 HPD/T, and preferably about 5 HPD/T. The homogeneous cellulosic mixture is then efficiently converted to the desired alkali cellulose derivative in deflaker 8 or, alternatively, transferred to secondary reactor 10. As in the case of the formation of carboxymethyl cellulose, the cellulose derivative mixture is retained therein for 2 to 60 minutes, and preferably about 30 minutes, at a temperature from about − 10° to 35° C., and preferably from about 0° to 10° C. Thereafter, the reaction temperature is raised to a suitable level until essentially all the alkali cellulose has been reacted with the chemical reactant. For the preparation of carboxymethyl cellulose, for example, the temperature reaction is raised from about 45° to 80° C., and preferably about 55° to 65° C.

The reactant cellulosic mass from either deflaker 8 or secondary reactor 10 is then transferred to recovery system 11 which, in general, can comprise any means capable of separating out the cellulose derivative therefrom. In a preferred system, the product is cooled to about room temperature and neutralized with an appropriate acid such as sulfuric, hydrochloric, and the like. The cellulose fibers are then separated by known methods such as by filtration, centrifugation, and the like, washed with an aqueous solution, preferably 60% to 70% by weight aqueous alcohol solution, and then dried.

Figure 2:
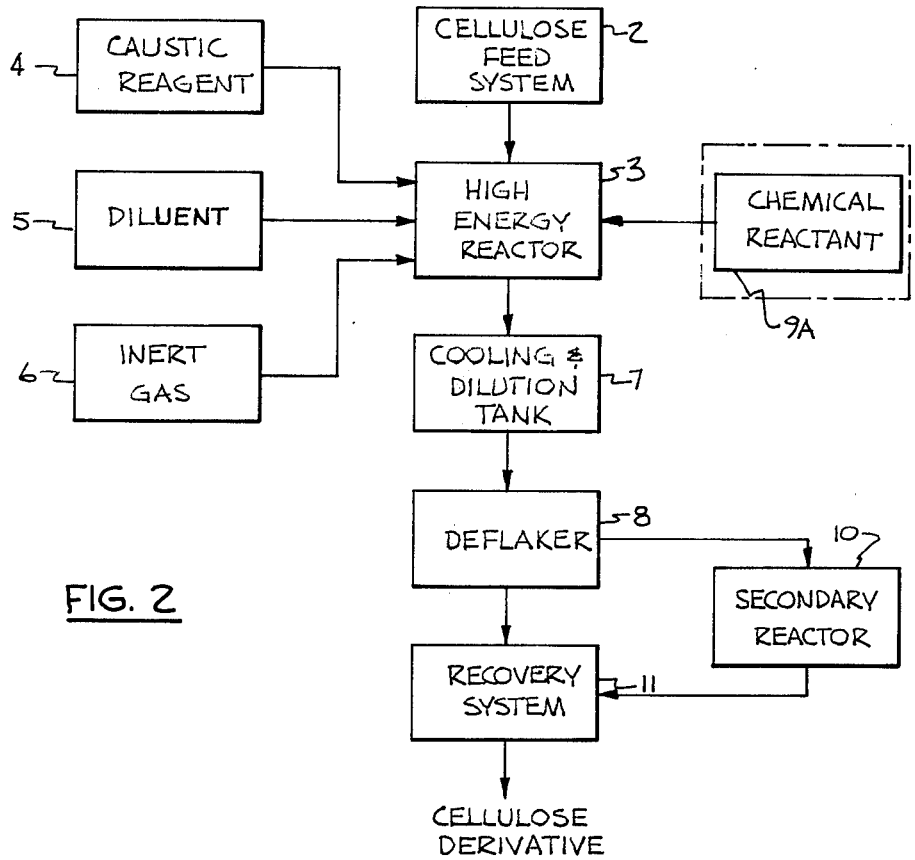
FIG. 2 is a similar schematic flow sheet in which derivatives of activated alkali cellulose are continuously produced by a high energy reaction process, the illustrative material contained within the dotted area representing modifications to the process of FIG. 1.

Referring now to FIG. 2, a more direct method of making cellulose derivatives from activated alkali cellulose is shown. The difference between the respective processes of FIGS. 1 and 2 is that the activated alkali cellulose formation and subsequent reaction with chemical reactant 9 are, in the case of FIG. 2, both conducted in high energy reactor 3. The other process parameters and steps, including material employed, ratios and types of reactants, consistencies, power inputs and the like, are substantially the same as those previously described.

Figure 3:
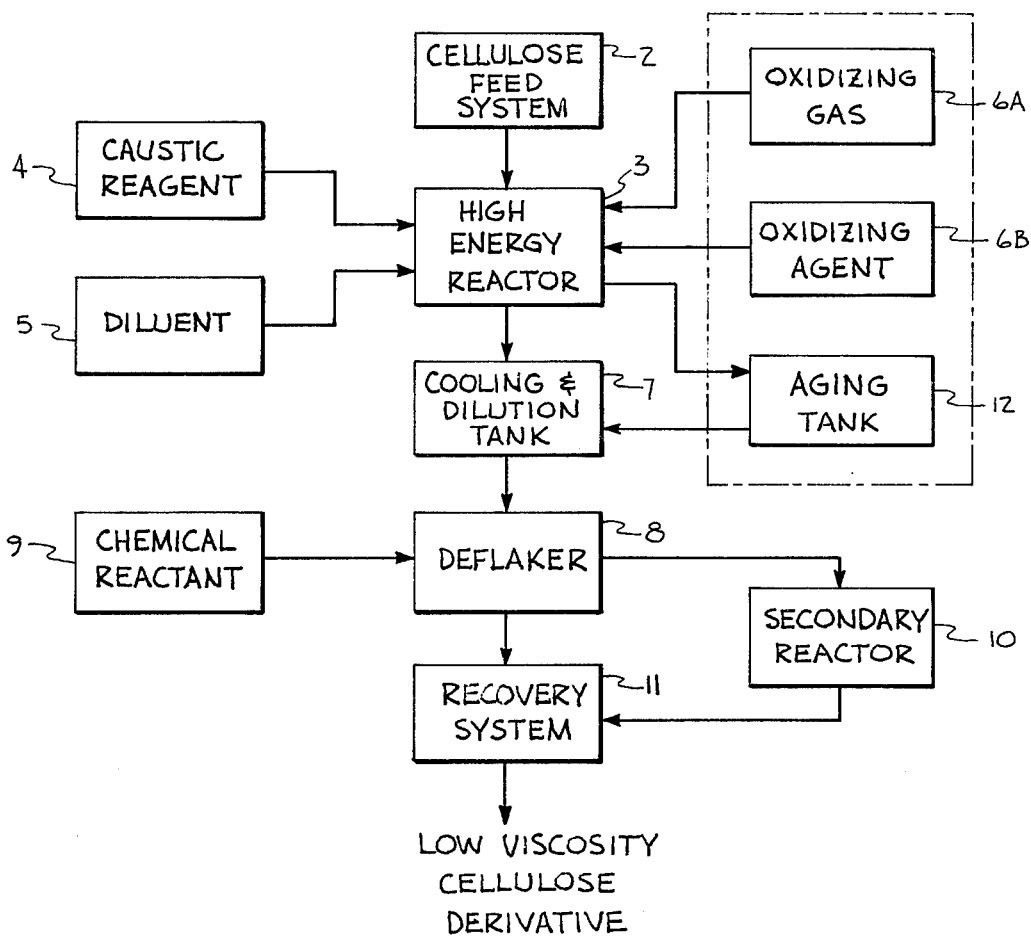
FIG. 3 is still a further schematic flow sheet in which low viscosity cellulose derivatives are produced by an oxidative reaction process, the illustrative material contained within the dotted area again representing modifications to the process of FIG. 1.

Referring now to FIG. 3, alkali cellulose having a low degree of polymerization and derivatives thereof are prepared in a similar manner to the basic process, except that inert gas 6 is replaced by oxidizing gas 6a and/or one or more oxidizing agents 6b. Typical prior art methods for preparing these low viscosity derivatives, as for instance, in the formation of low molecular weight carboxymethyl cellulose, require at least several hours to initially form carboxymethyl cellulose, and up to 48 additional hours of aging to reduce the viscosity of the product to an acceptable level. In contrast, the process of the present invention is conducted in a relatively rapid manner and requires minimum reaction and aging times, respectively.

Various known oxidizing gases may be used in forming the requisite low viscosity product of this invention. Preferably, oxygen, air or another oxygen-containing gas, by itself or in combination with one or more oxidizing agents 6b, is added to reactor 3 at flow rate of about 1 to 20 ft³/minute and, preferably about 8 to 10 ft³/minute. This oxidative treatment is even more effective, however, if a few parts per million of an activated metal ion such as cobalt and the like is added along with the oxidizing gas. A wide range of oxidizing agents 6b can be used alone or in combination with other oxidizing agents and/or oxidizing gases. Preferred oxidizing agents include sodium hypochlorite containing activated chlorine, hydrogen peroxide and combinations of these materials with a few parts per million of an activated metal ion such as cobalt and the like. For purposes of illustration, in the manufacture of low viscosity carboxymethyl cellulose, typical ranges of oxidizing agents would include sodium hypochlorite containing activated chlorine in an amount from about 0.2% to 6%, and preferably from about 2% to 4% of the total weight of cellulose in the total reaction medium, and hydrogen peroxide from about 0.2% to 5%, and preferably from about 1% to 3%, of the total weight of cellulose in the reaction medium. If a few parts per million of a metal ion are added along with the hydrogen peroxide, a more effective oxidation of the cellulose product will occur. As to alkali cellulose having a low degree of polymerization previously described, it can be xanthated to form a derivative from which viscose rayon is then prepared. In addition, the process shown in FIG. 3 permits control of both the physical and chemical properties of the desired final low viscosity product by merely adjusting the reaction parameters. A 1% Brookfield solution viscosity at 25° C. of less than about 100 cps, and preferably less than about 50 cps, for the low viscosity product is preferred.

When oxidizing agents are employed, an even more rapid breakdown of the cellulose derivative will occur when the power from the high energy reactor is imparted to the fibers. Therefore, a work input of more than 5 HPD/T, and preferably more than 15 HPD/T, is generated, the maximum power transmitted to the fiber being dependent upon the point at which the cellulose fibers will no longer remain in substantially intimate contact one with the other.

As in the method of FIG. 2, the process steps occuring both prior and subsequent to the low viscosity product formation in high energy reactor 3 are substantially the same as their counterparts in the basic process of FIG. 1.

The reactions according to the process appearing in any of FIGS. 1–3, as previously described, can be conducted on a continuous, semicontinuous, or batch-wise basis.

The following examples illustrate the invention, but are not to be construed as limiting the scope thereof.

EXAMPLE 1

The conversion coefficient of the activated alkali cellulose product of the present invention, prepared by the system illustrated in FIG. 1, was determined with respect to a comparable alkali cellulose product prepared by conventional means. In both experiments, a 31.55% O.D. unparticularized, undried bleached kraft pulp, having a $Cu(en)_2$ 1% viscosity of 108, as determined by TAPPI Testing Procedure T-230, was employed.

A. In the first instance, a total of 10 pounds of the above described cellulose feed, 5 pounds of caustic soda, and 26.7 pounds of water were metered over a total time period of about 2 minutes through the center duct or eye of a 24-inch double disc Bauer 415 high consistency refiner into a working space formed between a pair of rotatable discs, which had previously been evacuated with nitrogen. Each of the above discs carried a movably mounted, roughened surface, refining plate section. The nominal consistency of the feed, measured at the exit of the refiner, was 23.9%. The discs were rotatable in opposite directions about a fixed common axis by suitable power means. The roughened surfaces were in relatively high motion with respect to each other and spaced and maintained apart at a distance not less than, and in actuality slightly greater than, the thickness of the individual fibers being treated. This spacing was maintained since, as previously described in more detail, it was critical that the roughened surfaces did not particularize the cellulose fibers, but instead imparted confrication thereof. The refiner surfaces were operated at a predetermined power input level of about 15 HPD/T so that the desired degree of confrication was maintained.

To produce the energy required for confrication, the relative movement between the two surfaces will vary depending upon the type of apparatus employed. In general, the surfaces should operate at a relative tangential velocity of no less than about 1000 ft/minute, and the rotation should be about a fixed axis to obviate relative gyratory movement which causes balling of the fibers. When one of the surface is stationary, the relative tangential velocity of the surfaces should preferably be at least 5000 ft/minute, and in the case where both surfaces are moving in opposite directions, a relative tangential velocity of at least 15,000 ft/minute is preferred. Under all conditions, the velocity between the refiner surfaces should be sufficiently great so as to impart sufficient energy to the fibers to effect confrication and, at the same time, provide sufficient energy to move the fibers through the refiner. The two surfaces between which the pulp is treated should preferably be roughened by providing projections of such character as to engage the high consistency pulp.

Although the average operating pressure imparted by the refiner surfaces on the cellulosic fibers may vary, an average pressure of between 5 to 20 pounds/in² will be sufficient to produce a pulp of desired physical and chemical properties.

The pulp then is moved rapidly and continuously in a single pass through the work space, in a direction away from the point of introduction, toward the point of discharge, the activated alkali cellulose product being rapidly formed therein.

Two 209 g. samples of the product from the refiner, corresponding to about 50 g. of pulp, 134 g. of water and 25 g. NaOH, were added to 750 g. of cooled (about 10° C.) isopropanol. These samples were quickly deflaked by a 30-second treatment in a gallon-sized Waring Blendor and then titrated, as hereinafter described.

B. In a comparable conventional mercerization process known by previous testing and analysis to produce alkali cellulose, a 50 g. O.D. pulp sample in 109 g. of water was added to 750 g. of isopropanol containing 50 g. of 50% NaOH. This resulted in a suspension of 50 g. of pulp in 884 g. of 85% isopropanol-water containing 25 g. NaOH. The suspension was then reacted for one hour at 0–10° C. with stirring.

The respective alkali cellulose products were neutralized using 2.82 N HCl which was added with mild stirring by means of a paddle stirrer. Each addition of acid was accurately controled so that the pH of the mixture was never permitted to fall below a lower level than 7. After each HCl addition and lowering of the pH to a reading of 7, the pH was permitted to rise and seek its maximum level. Acid was again added to give a pH of 7 and the process repeated until the pH meter needle substantially maintained itself at pH 7.

After the initial introduction of an amount of acid which lowered the pH of the conventionally prepared sample to a value of 7, a total of 3 further additions were required to neutralize the conventionally prepared alkali cellulose. The conversion coefficient of this material was, therefore, 4. A total of 219 ml of HCl, which corresponds to 97.5% of the sodium hydroxide reagent in the system, was added.

The activated alkali cellulose isopropanol suspensions were recovered from the Waring Blendor and then titrated in exactly the same fashion as previously described for the conventionally prepared material. The samples required 33 and 34 separate HCl additions, respectively, until the pH of the mixture was fairly stabilized at pH 7. Therefore, the conversion coefficient (average of two runs) of the activated alkali cellulose of this invention was 33.5. A total of only 175.2 ml of HCl (average of two runs) which corresponds to about 79% of the sodium hydroxide in the system, was added. This suggests that additional caustic is still associated with the pulp, and that an even greater number of HCl additions would probably be required for complete neutralization.

The foregoing results clearly indicate that a more reactive alkali cellulose product, in which the caustic reagent is integrally associated with, and uniformly distributed along, the cellulose fibers, as evidenced by the fact that more than eight times the number of acid additions were required to provide complete neutralization, can be continuously produced by the basic process of this invention, in a significantly shorter reaction time period, than by a comparable conventional alkali cellulose system.

EXAMPLE 2

To illustrate several preferred embodiments of this invention, the amount of the cellulose feed stock which was retained on a standard 35-mesh screen was derived through the use of TAPPI Method T233 Su-64. In addition, the percent fiber length retention of the alkali cellulose produced by the process of FIG. 1, employing the above cellulose feed, was also determined.

A 31.4% O.D. cellulose feed stock was obtained by processing a Douglas fir bleached kraft pulp without drying or particularization. Fiber fractionations were then carried out according to the above TAPPI test method. The relative amount of cellulose fiber retained on each successive screen was as follows:

60.52% (14-mesh)
9.92% (20-mesh)
12.65% (35-mesh)
9.00% (65-mesh)
2.63% (150-mesh)
5.95% of the above fibers passed through the 150-mesh screen Since substantially all of the prior art references require the cellulose feed stock to pass through a 35-mesh screen, the total amount of fibers retained on a 35-mesh screen was determined for comparison purposes. More specifically, it was found that 83.2% of the subject cellulose feed stock used in the process of this invention was retained on a 35-mesh screen, or larger.

The above pulp was then converted to alkali cellulose using a Bauer 415 refiner. The method employed herein was similar to that used in Example 1. The pulp was fed to the refiner while 50% sodium hydroxide was pumped into the refiner work space. A power input of 18 HPD/T was maintained therein. The duration of the above addition was about 3 minutes. A total of 15 pounds of pulp, 7.5 pounds of sodium hydroxide, and 40.3 pounds of water were added to the refiner. The nominal consistency of the pulp mass was about 23.9%. Activated alkali cellulose was rapidly produced under the above conditions.

Three 209-gram samples of the activated alkali cellulose product were added to 1500 ml of water, containing 45 grams of glacial acetic acid for purpose of neutralizing the caustic. The samples were stirred for a half hour with a paddle stirrer, and then deflaked for 20 seconds in a Waring Blendor. Finally, the three samples were filtered, washed and tested according to the procedure set forth in the above TAPPI test.

The percent fiber length retention was then derived by comparing the weighted average fiber length of the three activated alkali cellulose samples produced above with the weighted average fiber length of the previously described cellulose feed stock. The weighted average fiber length was calculated according to the procedure outlined in the aforementioned article by Tasman. More specifically, the weighted average fiber length of the alkali cellulose and cellulose feed stock were calculated to be 1.511 mm and 2.415 mm, respectively. Therefore, the percent fiber length retention of the activated alkali cellulose product was determined to be 62.6%.

EXAMPLE 3

The effect of employing the process of FIG. 1 in which activated alkali cellulose of this invention was provided as the intermediate in forming celulosic derivatives, the cellulose feed again being charged without substantial drying or particularization, has been determined.

A. The conventional procedure outlined in Example 1 was followed using a bleached wood pulp of 89 G.E. brightness points, 89% alpha-cellulose content and having 39.1% consistency. The fibers were dried at 65° C. for 10 hours and then were passed through a Wiley mill equipped with a 40-mesh screen to floc them to a fine powder; 30 g. of this powder were then added to 600 g. of 87% isopropanol-water solution at 15° C. in a 2-liter resin flask equipped with an $N_2$ inlet, Teflon paddlebladed stirrer and a reflux condenser. The system was flushed with $N_2$ and the mixture stirred. Over a 5-minute period, 37 g. of a 50% NaOH solution were added. The mixture was then maintained at 15° C. for 30 minutes with good agitation. At the completion of the alkali cellulose formation, 19.2 g. of chloroacetic acid in 40 ml of isopropanol were added and the mixture stirred at about 25° C. for 30 minutes. It was then heated at 60° C. for 3 hours with continuous stirring to form carboxymethyl cellulose. Thereafter, the product formed was coooled, neutralized to pH 7 with 917 ml of 35% HCl, and the fibers were filtered, washed twice with a liter of 70% MeOH, filtered, and dried at 60° C. The dried carboxymethyl cellulose had a 1% Brookfield solution viscosity at 25° C. of 2280 cps. The product tended to clump together when added to water and required more than 40 minutes to dissolve therein. The solution formed contained fine, unreacted fibers and a number of visible agglomerated gel particles.

B. A representative run was made using a bleached wood pulp from the same pulp mill as above and with similar properties, except that it had a viscosity of 168 and a consistency of 34.8%, was treated in a high consistency refiner according to the procedure set forth in Example 1, except that the pulp was passed through the refiner at a power input of 29 HPD/T. The material was diluted with water and centrifuged to a 29.0% consistency. The damp activated alkali cellulose pulp was reacted with chloroacetic acid as described above. The dried material produced by the process of this invention had a 1% Brookfield solution viscosity, at 25° C., of 2976 cps. The material dissolved much more rapidly, i.e., in about 10 minutes, to give a clear solution with considerably less visible gel particles.

From the results of the foregoing tests, it was concluded that when the process described in FIG. 1 was employed, a higher viscosity cellulosic derivative, at least greater than 26% higher, can be provided than with a comparable conventionally prepared material. Furthermore, by utilizing activated alkali cellulose as the precursor in forming compounds such as carboxymethyl cellulose, a cellulose derivative can be produced having a greater number of more uniformly substituted constituent groups attached to the cellulosic backbone. This has been determined by the rapid manner in which the carboxymethyl cellulose dissolved in water, about four times as fast as its conventional counterpart, as well as the presence of a significantly smaller amount of unreacted fibers and visible gel particles.

EXAMPLE 4

The effect of using a refiner which does act as a high energy reactor, as previously defined, was determined. The same pulp used in the high consistency refiner of Example 1 was treated in a Valley beater. First, the freeness level of the slurry was lowered from 755 Canadian Standard Freeness(CSF) to 12 CSF. The resulting pulp was centrifuged to a consistency of 19.8% and sufficient isopropanol was added to give a slurry containing 87% by weight isopropanol-water. Part of the solvent was then decanted so that 600 g. of the above slurry remained. The mixture was then treated as in Example 3 to give 41.4 g. of carboxymethyl cellulose. This material had similar solubility properties and as high gel content as the conventional carboxymethyl cellulose of Example 3(A). In addition, the 1% Brookfield viscosity of the solution, at 25°C., was only 840 cps. By comparing the above conventionally prepared carboxymethyl cellulose with the carboxymethyl cellulose of this invention (see Example 3(B)), it is concluded that a reactor which does not impart the requisite type and degree of confrication to the high consistency cellulose feed cannot be employed to provide high viscosity cellulosic derivatives which exhibit the aforementioned requisite viscosity and solubility properties.

EXAMPLE 5

Formation of cellulose derivatives by the process of FIG. 2, as compared to a conventional method wherein the cellulose, caustic reagent and chemical reactant are combined directly in a batch-type reactor, was determined. The results obtained by the representative reaction shown below are illustrative of the data repeatedly observed with other pulps when combined with caustic and chloroacetic acid directly in a conventional reactor. The same pulp used in Example 3(A), at 29.0% consistency, was charged to a conventional reactor containing isopropanol. A slurry containing 87% by weight isopropanol-water was formed, 21 g. of 50% NaOH being added over a 30-minute period with stirring. The alkali cellulose formed was combined with a sodium chloroacetate solution which had been previously prepared by mixing 19.2 g. of chloroacetic acid with 16.5 g. of NaOH in 24 g. of $H_2O$. The mixture was then stirred at about 25°C. for ½ hour and then reacted for 3 hours at 60°C. The 1% Brookfield solution viscosity, at 25° C., of the carboxymethyl cellulose product was only 992 cps which is about half the viscosity expected from the pulp used.

A high-brightness papermaking wood pulp of 88% alphacellulose content and a $Cu(en)_2$ viscosity of 149 was centrifuged to a 33.7% consistency and was charged to the high consistency refiner described in Example 1(A), containing an 87% by weight isopropanol-water mixture; 10 ft³/minute of $N_2$ was also added. At the same time, a 49% solution of NaOH and a 39.7% solution of sodium chloroacetate were introduced to the eye of the refiner so that the molar ratio of cellulose-to-caustic-to-chloroacetic acid was about 1.0:0.61:0.61. The energy imparted to the fibers by means of said refiner was 16.5 HPD/T. The mixture was maintained at 27° C. for 15 minutes with stirring, then warmed to 60° C. for 5 hours. The final carboxymethyl cellulose product had a 1% Brookfield solution viscosity of 1900 cps.

From the foregoing results, it is concluded that by employing the process of this invention, i.e., the simultaneous addition of cellulose, a caustic reagent and a chemical reaction to a high energy reactor, the continuous, rapid formation of activated alkali cellulose and high quality cellulose derivatives of high solution viscosity, are provided. Contrarily, when a similar simultaneous reaction was attempted in a conventional system, there occurred a substantial loss in viscosity which was greater than about one-half of that which was obtained by the process of this invention.

EXAMPLE 6

The efficiency of utilization of the chemical reactant in preparing the cellulose derivatives of this invention, at various reaction parameters, has been determined. A number of representative experiments using the processes of FIGS. 1 and 2, respectively, were conducted by the hereinafter described general procedure. The reaction conditions and resultant efficiency of an illustrative group of these experiments are tabulated below. In general, pulp having a range of consistencies from about 25%–40% was fed to a refiner, as described in Example 1cA). At the same time, $N_2$ was passed through the refiner and a caustic reagent, or a caustic reagent and a chemical reactant, were added thereto through the refiner eye. If caustic alone was charged to the reactor, the chemical reactant was introduced after the alkali cellulose formation. The weight ratios of cellulose, caustic and the chemical reagent were from about 1.0:0.5:0.55 to 1.0:0.8:0.85, respectively. The energy imparted varied from between about 10 HPD/T to 20 HPD/T.

The material produced in the reactor, by the action of the refiner for periods of less than 60 seconds, was collected in cooled isopropanol-water at a temperature from 0° C. to 30° C. so that the final consistency would vary from about 4% to 6%. The material was then deflaked for 1 to 3 minutes in a commercial Waring Blendor. If only caustic was added at the refiner, the chemical reactant was added to the Blendor. The homogenized product was then held for from 0 to 30 minutes at 0° C., then warmed to 60° C. and maintained at that temperature for varying lengths of time. At the completion of the reaction, the material formed was neutralized to pH 7, filtered or centrifuged, washed one or more times with about 15 times its weight of either 70% methanol or isopropanol, dried and ground.

EXAMPLE 7

The effect of reacting cellulose and caustic in a high energy reactor along with an oxidizing gas or various oxidizing agents with short aging times has been demonstrated. A series of representative experiments using the following general method, illustrating the above reaction, are tabulated below. High viscosity, high consistency wood pulp was fed to a refiner of the type described in Example 1. At the same time, as shown in Table II, NaOH solutions of varying concentration were added through the refiner eye along with about 10 ft$^3$/minute of air instead of N$_2$, as in the prior examples, In addition, oxidizing agents such as NaOCl, H$_2$O$_2$ and-/or a few ppm of Co ion were included in these runs. The reaction temperature was held at 0° C. for 30 minutes, at which time the temperature was raised to 60° C. and maintained there for 3 hours. After passage through the refiner, the alkali cellulose was either added to the appropriate amount of cooled IPA/H$_2$O or was aged up to two additional hours with stirring in an open bleach cell at 49° C. The alkali cellulose slurry formed was then treated with the 0.55 part by weight

TABLE 1

| Feed Consistency | Confrication Energy | Weight Ratio of Cellulose: Caustic: Chloracetic Acid | Deflaking Used | Heating Schedule | Efficiency |
|---|---|---|---|---|---|
| 28.2% | 16.3 HPD/T | 1.0:0.6:0.64 (all chloroacetic acid added after refiner) | No | a) 30 min. at 15° C. b) 3 hrs. at 60° C. | 72% |
| 34.0% | 19.8 HPD/T | 1.0:0.6:0.64 (0.32 chloroacetic acid added in refiner and 0.32 chloroacetic acid added after refiner) | No | a) 30 min. at 0° C. b) 3 hrs. at 60° C. | 76% |
| 34.0% | 16.8 HPD/T | 1.0:0.6:0.64 (0.16 chloroacetic acid added in refiner and 0.48 chloroacetic acid added after refiner) | No | a) 30 min. at 0° C. b) added chloroacetic acid and maintain for 30 min. at 15° C. c) 3 hrs. at 60° C. | 75% |
| 34.6% | 18.1 HPD/T | 1.0:0.5:0.55 (all chloroacetic acid added at refiner) | No | a) 30 min. at 0° C. b) 3 hrs. at 60° C. | 73% |
| 35.0% | 11.3 HPD/T | 1.0:0.6:0.64 (all chloroacetic acid added at refiner) | Yes | a) 30 min. at 0° C. b) 3 hrs. at 60° C. | 74% |
| 33.6% | 10.6 HPD/T | 1.0:0.5:0.55 (all chloroacetic acid added at the deflaker) | Yes | a) 30 min. at 0° C. b) 3 hrs. at 60° C. | 74% |

From the foregoing tabulated results, it is seen that cellulosic derivatives can be efficiently prepared under the various process conditions previously outlined.

of chloroacetic acid while being deflaked in a one-gallon Waring Blendor. The process was then completed, as outlined in Example 1.

TABLE II

| Consistency | Refiner Power | Cellulose:Caustic Oxidizing Agent Ratio | 1% Brookfield Solution Viscosity at 25° C. in water, cps |
|---|---|---|---|
| 33.9% | 14.4 HPD/T | 1:0.55: 0.03 part H$_2$O$_2$ added | 40 |
| 34.8% | 17.0 HPD/T | 1:0.55: 30 ppm Co$^{++}$ added | 51 |

TABLE II – Continued

| Consistency | Refiner Power | Cellulose:Caustic Oxidizing Agent Ratio | 1% Brookfield Solution Viscosity at 25° C. in water, cps |
|---|---|---|---|
| 33.4% | 13.0 HPD/T | 1:0.55: 30 ppm Co$^{++}$ and 0.03 part H$_2$O$_2$ added | 11 |
| 33.7% | 16.8 HPD/T | 30ppm Co$^{++}$ and 0.03 part H$_2$O$_2$ added | 7 |
| 33.1% | 18.4 HPD/T | 1:0.55: 0.02 part active Cl as NaOCl added | 41 |

The foregoing data shows that low viscosity derivatives of alkali cellulose can be effectively, rapidly and continuously produced without long aging times by using the oxidative process of this invention, as shown in FIG. 3. The 3-hour reaction time period at 60° C. was employed as a standard in running the above experiments. However, reaction times of one hour would suffice in producing the requisite low molecular weight. In a similar manner, aging times of only an hour or less are actually needed to complete the aging process in tank 12 according to the present invention.

The forms and expressions which have been employed in the foregoing abstract and specification are used therein as terms of description and not of limitation, and there is no intention, in the use of such terms and expressions, of excluding equivalents of the features shown and described, or portions thereof, it being recognized that the scope of the invention is defined and limited only by the claims that follow.

What is claimed is:

1. A process for forming activated alkali cellulose which comprises confricating cellulose fibers, at high consistency, and a caustic reagent, said confrication step including the high energy, frictional interaction of said cellulose fibers which are maintained in relatively intimate contact one with the other, said resulting activated alkali cellulose product being characterized in that said caustic reagent has substantially penetrated, and is uniformly distributed along, said cellulose fibers.

2. The process of claim 1, wherein the activated alkali cellulose product formed has a penetration coefficient of greater than about 6.

3. The process of claim 1, wherein the activated alkali cellulose product formed has a penetration coefficient of greater than about 15.

4. The process of claim 1, wherein the percent fiber length retention of the activated alkali cellulose product is greater than about 50.

5. The process of claim 1, wherein the weighted average fiber length of said cellulosic fibers is greater than about 1.0 mm.

6. The process of claim 1, wherein the weighted average fiber length of said cellulose fibers is greater than about 1.5 mm.

7. The process of claim 1, wherein the consistency of such cellulose feed is from about 10% to 60% by weight, based on the total weight of the cellulose fibers in the feed and the amount of energy required for conducting said confrication step is at least about 8 HPD/T.

8. The process of claim 1, wherein the required time, measured from the initial contact of the cellulose and caustic, for substantially completing the reaction of said process, is less than about 90 seconds.

9. A process for forming an activated alkali cellulose product which comprises the steps of:
   a. introducing cellulose fibers, at high consistency, into the area formed within a high energy reactor, said area including means for confricating said fibers;
   b. adding to said inner area a caustic reagent; and
   c. confricating said cellulose fibers and caustic reagent, respectively, to form an activated alkali cellulose product, said confricating step including a high energy frictional interaction of said cellulose fibers which are maintained in relatively intimate contact one with the other, said resulting activated alkali cellulose product being characterized in that said caustic reagent has substantially penetrated, and is uniformly distributed along, said cellulose fibers.

10. The process according to claim 9, wherein said confricating means comprises a pair of opposed surfaces forming a work space therebetween, said surfaces being capable of rotating in relative motion with respect to each other for purposes of imparting to said respective fibers passing within said work space the amount of confricating energy required for forming activated alkali cellulose.

11. The process of claim 9, wherein the amount of energy required for conducting said confrication step is at least about 8 HPD/T, and the consistency is from about 10% to 60% by weight, based on the total weight of the cellulose fibers in the feed.

12. A process for forming uniformly substituted derivatives of activated alkali cellulose which comprises the steps of:
   a. introducing cellulose fibers, at high consistency, into a high energy reactor;
   b. adding to said reactor a caustic reagent;
   c. confricating said cellulose fibers and caustic reagent, respectively, to form an activated alkali cellulose product, said confrication step including a high energy, frictional interaction of said cellulose fibers which are maintained in relatively intimate contact one with the other, said resulting activated alkali cellulose product being characterized in that said caustic reagent has substantially penetrated, and is uniformly distributed along, said cellulose fibers; and
   d. reacting said activated alkali cellulose with a chemical reactive therewith to produce said uniformly substituted alkali cellulose derivative.

13. The process of claim 12, wherein the rate of efficiency, with respect to the utilization of said chemical reactant, in producing said cellulosic derivatives is greater than about 65%.

14. The process of claim 12, wherein the percent fiber length retention of said cellulose derivative is greater than 50%.

15. The process of claim 12, wherein the weighted average fiber length of the cellulose fibers is greater than about 1.0 mm.

16. The process of claim 12, wherein said consistency is from about 10% to 60% by weight, based on the total weight of the cellulose fibers in the feed and the amount of energy required for conducting said confrication step is at least about 8 HPD/T.

17. The process of claim 12, wherein the reaction time for said alkali cellulose formation process is less than about 90 seconds.

18. The process of claim 12, wherein the chemical reactant employed is chloroacetic acid and the alkali cellulose derivative formed is carboxymethyl cellulose.

19. A process for forming derivatives of activated alkali cellulose which comprises the steps of:
   a. introducing cellulose fibers, at high consistency, into the area formed within a high energy reactor, said area including means for confricating said fibers;
   b. adding to said area a caustic reagent;
   c. confricating said cellulose fibers and caustic reagent, respectively, to form an activated alkali cellulose product, said confrication step including a high energy, frictional interaction of said cellulose fibers which are maintained in relatively intimate contact one with the other, said resulting activated alkali cellulose product being characterized in that said caustic reagent has substantially penetrated, and is uniformly distributed along, said cellulose fibers; and
   d. reacting said activated alkali cellulose and a chemical reactive therewith to produce a cellulose derivative.

20. The process according to claim 19, wherein said confricating means comprises a pair of opposed surfaces forming a work space therebetween, said surfaces being capable of rotating in relative motion with respect to each other for imparting a sufficient amount of confrication energy to said fibers passing within said work space.

21. The process of claim 19, wherein the percent fiber length retention of the cellulose derivative is greater than about 50%.

22. The process of claim 19, wherein the amount of energy required for conducting the confrication step is at least about 8 HPD/T, and the consistency is from about 10% to 60%, based on the total weight of the cellulose fibers in the feed.

23. The process of claim 19, wherein the average pressure applied to the cellulosic feed within said work space by means of said opposed surfaces is from about 5 to 20 pounds per square inch.

24. The process according to claim 19, wherein the relative tangential velocity of said opposed surfaces in relative motion with respect to one another is at least about 1000 feet per minute.

25. A direct process for making an alkali cellulose derivative comprising the steps of:
   a. introducing cellulose fibers, at high consistency, into a high energy reactor;
   b. adding to said reactor a caustic reagent and a chemical reactive therewith; and
   c. confricating said cellulose fibers, caustic reagent and chemical reactant, respectively, to form said cellulose derivative, said confrication step including the high energy, frictional interaction of said cellulose feed fibers which are maintained in intimate contact one with the other.

26. The process of claim 25, wherein the rate of efficiency with respect to the utilization of said chemical reactant in producing said cellulosic derivative is greater than about 65%.

27. The process of claim 25, wherein the percent fiber length retention of said cellulosic fibers is greater than 50%.

28. The process of claim 25, wherein the weighted average fiber length of the cellulose fibers is greater than about 1.00 mm.

29. The process of claim 25, wherein greater than 70% by weight of the cellulose fibers in said feed are retained on a 35-mesh screen.

30. The process of claim 25, wherein said consistency is from about 10% to 60% by weight, based on the total weight of the cellulose fibers in the feed, and the amount of energy required for conducting said confrication step is at least 8 HPD/T.

31. The process of claim 25, wherein the chemical reactant employed is chloroacetic acid and the alkali cellulose derivative formed is carboxymethyl cellulose.

32. A process for making low molecular weight alkali cellulose derivatives comprising the steps of:
   a. introducing cellulose fibers, at high consistency, into a high energy reactor;
   b. adding to said reactor a caustic reagent and an oxidizing gas;
   c. confricating said fibers, caustic reagent, and oxidizing gas, respectively, to rapidly produce a substantially low molecular weight alkali cellulose material, said confrication step including the high energy, frictional interaction of said cellulose fibers which are maintained in intimate contact one with the other; and
   d. reacting said low molecular weight alkali cellulose and a chemical reactive therewith to form a low molecular weight cellulose derivative product.

33. The process of claim 32, wherein an oxidizing agent is added instead of said oxidizing gas.

34. The process of claim 32, wherein an oxidizing agent is added along with said oxidizing gas to the reactor.

35. The process of claim 34, wherein an activated metal ion is added along with said oxidizing gas and oxidizing agent, respectively.

36. The process of claim 34, wherein said consistency is from about 10% to 60%, based on the weight of cellulose fibers in the feed, said confrication energy is at least 5 HPD/T, said oxidizing gas is added at the rate of from about 1 to 20 cubic feet per minute, and the amount of said oxidizing agent added is from about 0.2% to 6% by weight based on the total weight of cellulose in the system.

* * * * *

UNITED STATES PATENT OFFICE
CERTIFICATE OF CORRECTION

Patent No. 3,915,959             Dated  October 28, 1975

Inventor(s)  David W. Goheen et al.

It is certified that error appears in the above-identified patent and that said Letters Patent are hereby corrected as shown below:

In column 1, line 34, delete "begin with high quality, uniformly substituted cellulose derivatives".

In column 6, line 9, change the spelling of "pnetrated" to - - - penetrated - - -.

In column 10, line 7, change the spelling of "celluloee" to - - - cellulose - - -.

In column 16, line 67, delete "Example 1cA)", and insert in its place - - - Example 1(A) - - -.

In column 19, TABLE II - Continued, after the figures "33.7% 16.8 HPD/T", under the column designated "Cellulose: Caustic Oxidizing Agent Ratio", insert the figures - - - 1:0.55: - - -.

Signed and Sealed this

Fourth Day of October 1977

[SEAL]

Attest:

RUTH C. MASON
Attesting Officer

LUTRELLE F. PARKER
Acting Commissioner of Patents and Trademarks